US009790319B2

(12) United States Patent
Kasemi et al.

(10) Patent No.: US 9,790,319 B2
(45) Date of Patent: *Oct. 17, 2017

(54) CURING AGENTS FOR LOW-EMISSION EPOXY RESIN PRODUCTS

(71) Applicant: SIKA TECHNOLOGY AG, Baar (CH)

(72) Inventors: Edis Kasemi, Zurich (CH); Andreas Kramer, Zurich (CH); Ursula Stadelmann, Zurich (CH); Urs Burckhardt, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/759,560

(22) PCT Filed: Dec. 20, 2013

(86) PCT No.: PCT/EP2013/077701
§ 371 (c)(1),
(2) Date: Jul. 7, 2015

(87) PCT Pub. No.: WO2014/108304
PCT Pub. Date: Jul. 17, 2014

(65) Prior Publication Data
US 2015/0344615 A1    Dec. 3, 2015

(30) Foreign Application Priority Data

Jan. 8, 2013   (EP) .................... 13150534
Jan. 8, 2013   (EP) .................... 13150545

(51) Int. Cl.
C08G 59/50   (2006.01)
C08G 59/18   (2006.01)

(52) U.S. Cl.
CPC ......... *C08G 59/504* (2013.01); *C08G 59/184* (2013.01); *C08G 59/5006* (2013.01)

(58) Field of Classification Search
CPC .................................................. C08G 59/504
See application file for complete search history.

(56) References Cited

U.S. PATENT DOCUMENTS

| | | | |
|---|---|---|---|
| 4,751,278 A | 6/1988 | Brytus | |
| 7,683,154 B2 | 3/2010 | Volle | |
| 7,786,223 B2 | 8/2010 | Muller-Frischinger | |
| 8,063,157 B2 | 11/2011 | Volle et al. | |
| 8,518,547 B2 | 8/2013 | Vedage et al. | |
| 2004/0077802 A1 | 4/2004 | Scherzer et al. | |
| 2008/0287644 A1* | 11/2008 | Hummel | C08G 59/184 528/365 |
| 2009/0005516 A1 | 1/2009 | Volle | |
| 2009/0029175 A1 | 1/2009 | Vedage et al. | |
| 2009/0036582 A1 | 2/2009 | Muller-Frischinger | |

FOREIGN PATENT DOCUMENTS

| | | |
|---|---|---|
| CN | 101374879 A | 2/2009 |
| CN | 101643540 A | 2/2010 |
| EP | 1 385 896 A1 | 2/2004 |
| GB | 1 258 454 A | 12/1971 |
| JP | 62-177016 A | 8/1987 |
| WO | WO 99/28365 A1 | 6/1999 |
| WO | WO 02/074832 A1 | 9/2002 |
| WO | WO 2007/060091 A1 | 5/2007 |
| WO | 2010/121397 A1 | 10/2010 |
| WO | 2011059500 A2 | 5/2011 |

OTHER PUBLICATIONS

International Search Report (PCT/ISA/210) mailed on Nov. 4, 2014, by the European Patent Office as the International Searching Authority for International Application No. PCT/EP2013/077703.
Written Opinion (PCT/ISA/237) mailed on Nov. 4, 2014, by the European Patent Office as the International Searching Authority for International Application No. PCT/EP2013/077703.
International Search Report (PCT/ISA/210) mailed on Nov. 4, 2014, by the European Patent Office as the International Searching Authority for International Application No. PCT/EP2013/077701.
Written Opinion (PCT/ISA/237) mailed on Nov. 4, 2014, by the European Patent Office as the International Searching Authority for International Application No. PCT/EP2013/077701.
Notification of Transmittal of Translation of the International Preliminary Report on Patentability (Forms PCT/IB338 and PCT/IB/373) and the Written Opinion of the International Searching Authority (Form PCT/ISA/237) issued on Jul. 23, 2015, by the International Bureau of WIPO in corresponding International Application No. PCT/EP2013/077701. (5 pages).
Office Action (Notification of the First Office Action) issued on Jul. 13, 2016, by the Chinese Patent Office in corresponding Chinese Patent Application No. 201380067457.8, and an English Translation of the Office Action. (16 pages).
Office Action (Notification of the Second Office Action) issued on Mar. 31, 2017, by the State Intellectual Property Office of the People's Republic of China in corresponding Chinese Patent Application No. 201380067457.8, and an English Translation of the Office Action. (16 pages).
Notification of the Third Office Action issued by State intellectual Property Office in corresponding CN 201380087457.8 dated Aug. 18, 2017 (with English language translation).

* cited by examiner

*Primary Examiner* — Megan McCulley
(74) *Attorney, Agent, or Firm* — Buchanan Ingersoll & Rooney PC

(57) ABSTRACT

The present invention relates to curing agents for epoxy resins, containing at least one adduct of trimethylhexamethylenediamine and cresyl glycidyl ether. The curing agent has a low viscosity and cures quickly together with epoxy resins even in moist, cold conditions and without blushing to form films with a high hardness and surface quality, which scarcely undergo yellowing upon exposure to light. It is particularly suited for low-emission room temperature-curing coatings.

19 Claims, No Drawings

CURING AGENTS FOR LOW-EMISSION EPOXY RESIN PRODUCTS

FIELD OF TECHNOLOGY

The invention relates to the area of curing agents for epoxy resins, epoxy resin products and the use thereof, especially as coatings, coverings and paints.

PRIOR ART

Epoxy resin products suitable for coating purposes should have the lowest possible viscosity in order to be easy to handle at ambient temperature and self-leveling. In addition, they should cure as quickly as possible and trouble-free, even under moist, cold conditions, forming a uniform, non-tacky surface without cloudiness, spots or craters. Finally, a cured coating should have high hardness to resist mechanical stresses insofar as possible. For applications in which appearance is important, for example top coats of floor coverings, a coating should also exhibit the lowest possible tendency to yellow under the influence of light.

To attain these properties, in epoxy resin coatings according to the prior art, amine-based curing agents are usually used, containing amines—principally primary diamines—adducted with epoxy resin. The adduction makes it possible to achieve distinctly more rapid development of strength in the coating, and fewer blushing effects occur than with nonadducted amines. "Blushing effects" are defined as surface defects that develop during curing, such as clouding, spotting, roughness and tackiness, which are caused by formation of salts ("blushing") of amines with carbon dioxide ($CO_2$) from the air and especially occur at high humidity and low temperatures. However, adduction typically leads to high viscosity, and therefore such curing agents must be diluted to ensure that the coating will be easy to handle and self-leveling and will have a good-looking surface. Alcohols, especially benzyl alcohol or glycols, are usually used as diluents. However, these are unreactive toward epoxy resins and therefore are not incorporated in the resin matrix during curing. Today, however, low-emission products are increasingly desired; after curing these have lower contents of substances that can be released by evaporation or diffusion processes. Therefore non-reactive diluents may only be used in very small quantities or not at all for low-emission epoxy resin products.

In place of non-reactive diluents, the viscosity of the curing agent can also be reduced by using a low degree of adduction of the amines, or the adduct may be further diluted by addition other amines. As a result, however, the curing agent will contain larger amounts of free low-molecular-weight amines, which are volatile and highly odoriferous and have a great tendency to cause blushing effects.

Amine-containing curing agents based on low-viscosity adducts that can be used with little or no diluent are known from the prior art. These are adducts of amines with monoepoxides.

In EP 1 385 896, adducts of amines and polyalkylene glycol monoglycidyl ethers are described. To be sure, these adducts have low viscosity, but they are only of limited suitability as curing agents for epoxy resin coatings, since they provide insufficient hardness and/or surface quality.

Another known low-viscosity adduct is obtained from 1,5-diamino-2-methylpentane and cresyl glycidyl ether. It makes possible the production of epoxy resin coatings containing little or no diluent and curing largely without blushing effects. However, the rate of curing or build-up of strength as well as the surface quality of such coatings need further improvement. In addition, the residual content of free 1,5-diamino-2-methylpentane, because of its volatility and odor, may require distillative purification of the adduct, which entails high costs for the apparatus and greatly increases the cost of the curing agent.

PRESENTATION OF THE INVENTION

Therefore the goal of the present invention is to supply an amine-containing curing agent for low-emission epoxy resin products that has low viscosity and makes possible epoxy resin compositions which do not have a tendency toward blushing effects even at relatively low temperatures, cure quickly and provide films of high hardness and surface quality.

Surprisingly it was found that the curing agent according to claim 1 solves this problem very well. The adduct contained in the curing agent according to claim 1 has a very low viscosity, can be produced by a simple process without a distillation step, is free from volatile, highly odoriferous amines and cures together with conventional epoxy resins even under moist, cold conditions, for example at 8° C., rapidly forming films of high hardness and good surface appearance, especially remarkably high luster that scarcely undergo yellowing upon exposure to light. Thus the curing agent according to claim 1 makes it possible to produce high-quality, easy to handle, self-leveling epoxy resin coatings even without the use of non-reactive diluents and intensely odoriferous amines.

Particularly surprising is the fact that the curing agent according to claim 1 usually makes possible epoxy resin coatings of lower viscosity compared to curing agents of similar composition according to the prior art, wherein the respective strength build-up takes place about as quickly as or even more quickly, with comparably good or even distinctly better surface quality. In addition, the curing agent according to claim 1 makes possible the production of curing agents for epoxy resins that are completely free from volatile, intensely odoriferous amines.

With the curing agent according to claim 1 it is possible to obtain low-emission epoxy resin products that meet the conditions for eco-certification, for example according to Emicode (EC1 Plus), AgBB, DIBt, Der Blaue Engel [The Blue Angel], AFSSET, RTS (M1) and US Green Building Council (LEED), and at the same time meet high requirements for processing and utilization properties.

Additional aspects of the invention form the subject matter of additional independent claims. Particularly preferred embodiments of the invention are the subject of the dependent claims.

METHODS OF EXECUTING THE INVENTION

The subject matter of the invention is a curing agent, suitable for curing epoxy resins, containing at least one adduct of trimethylhexamethylenediamine and cresyl glycidyl ether.

An "adduct" is defined as the reaction mixture following an addition reaction. Substance names beginning with "poly" such as polyamine, polyol or polyepoxide designate substances which formally contain two or more of the functional groups that occur in their name per molecule.

A "primary amino group" refers to an $NH_2$ group that is attached to an organic radical, and a "secondary amino group" refers to an NH group that is attached to two organic radicals, which may also together be part of a ring.

"Amine hydrogen" refers to the hydrogen atoms of primary and secondary amino groups.

"Amine hydrogen equivalent weight" refers to the weight fraction of a curing agent or an amine per amine hydrogen present in the curing agent or amine.

"Non-reactive diluent" refers to a substance that is soluble in an epoxy resin and which lowers the viscosity of the epoxy resin, but which is not covalently incorporated in the resin matrix during curing of the epoxy resin.

The term "viscosity" in this document refers to the dynamic viscosity or shear viscosity, which is defined by the ratio of shear stress and shear rate (velocity gradient), and is determined as described in DIN EN ISO 3219.

Particularly suitable as the trimethylhexamethylenediamine (TMD) are 2,2,4-trimethyl-1,6-hexanediamine 2,4,4-trimethyl-1,6-hexanediamine and any mixtures of these isomers. These adducts can be obtained especially easily.

Suitable cresyl glycidyl ethers are all isomeric cresyl glycidyl ethers and any mixtures thereof.

Ortho-cresyl glycidyl ether is especially suitable. These adducts are particularly readily obtainable.

In particular, the adduct is produced by mixing TMD and cresyl glycidyl ethers and reacting the epoxide groups with the amine groups using conventional methods, especially at a temperature in the range of 40 to 160° C., preferably 60 to 140° C.

The adducting is preferably carried out by slowly adding cresyl glycidyl ether to an initial quantity of TMD while maintaining the reactant temperatures preferably in the range of 40 to 160° C., especially 60 to 140° C.

Excess added or unreacted TMD can be removed after the reaction, for example by distillation, especially by thin-layer distillation. Preferably it is not removed. As a result, the production of the adduct is especially simple. Since TMD is of low volatility and not very odor-intensive and scarcely causes blushing, a residual content of free TMD in the adduct is not problematic.

A commercially available TMD is preferably used, especially Vestamin® TMD (from Evonik).

A commercially available cresyl glycidyl ether is preferably used, especially Araldite® DY-K (from Huntsman), Polypox™ R6 (from Dow), Heloxy™ KR (from Hexion) or Erisys® GE-10 (from CVC Spec. Chem.).

A preferred adduct is produced by reacting TMD and cresyl glycidyl ether in a TMD molecules/cresyl glycidyl ether molecules molar ratio in the range of 0.9:1.0 to 2.0:1.0, preferably 0.95:1.0 to 1.5:1.0, especially 1.0:1.0 to 1.25:1.0. An adduct of this type can be used as a component of the curing agent described without further work-up and makes it possible to obtain especially reactive and low-viscosity curing agents.

The adduct preferably has an amine hydrogen equivalent weight in the range of 80 to 125 g/Eq, particularly preferably 90 to 120 g/Eq, especially 95 to 115 g/Eq. An adduct of this type has a low viscosity and with conventional epoxy resins, cures rapidly and largely without blushing effects, to form films of high hardness.

The adduct contains as its principal constituent monoadducts of formula (I) and as additional constituents, diadducts of formula (II) and optionally unreacted TMD. The term "adduct" here includes all these constituents.

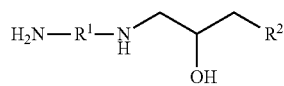

(I)

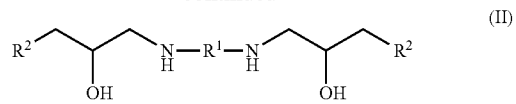

(II)

In formulas (I) and (II)
$R^1$ represents the difunctional residue of TMD after removal of its two primary amine groups, and
$R^2$ represents the residue of cresyl glycidyl ether after removal of its epoxide group.

The adduct of TMD and cresyl glycidyl ether has particularly low viscosity compared with other, similar adducts. In particular, compared with adducts of 1,5-diamino-2-methylpentane and cresyl glycidyl ether, at the same amine hydrogen equivalent weight, it permits the production of low-viscosity epoxy resin coatings that build up strength almost as quickly or even more quickly and attain better surface quality, in terms of the gloss level, than those.

Thus the curing agent described is particularly suitable for use in coatings. In this process, typically clear films of high hardness and remarkably high luster form, which even under difficult curing conditions, such as high humidity and/or low temperature, are largely free from blushing effects and scarcely exhibit any yellowing when exposed to light.

The curing agent described, in addition to the adduct of TMD and cresyl glycidyl ether, preferably additionally contains at least one additional polyamine with at least two amine hydrogens reactive toward epoxide groups.

The following polyamines are especially suitable for this purpose:
aliphatic, cycloaliphatic or arylaliphatic primary diamines, especially 2,2-dimethyl-1,3-propanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine, 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (=isophorone diamine or IPD), 2- and 4-methyl-1,3-diaminocyclohexane and mixtures thereof, 1,3-bis(aminomethyl)cyclohexane, 1,4-bis(aminomethyl)cyclohexane, 2,5(2,6)-bis(aminomethyl)-bicyclo[2.2.1]heptane (NBDA), 3(4),8(9)-bis(aminomethyl)tricyclo[5.2.1.0$^{2,6}$]-decane (TCD-diamine), 1,4-diamino-2,2,6-trimethylcyclohexane (TMCDA), 1,8-menthanediamine, 3,9-bis(3-aminopropyl)-2,4,8,10-tetraoxaspiro[5.5]undecane, and 1,3-bis(aminomethyl)benzene (MXDA);
tertiary amine group-containing polyamines with two or three primary aliphatic amine groups, especially N,N'-bis(aminopropyl)-piperazine, N,N-bis(3-aminopropyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethyl-hexylamine, tris(2-aminoethyl)amine, tris(2-aminopropyl)amine, tris(3-aminopropyl)amine, and the products from the double cyanoethylation and subsequent reduction of fatty amines derived from natural fatty acids, such as N,N-bis(3-aminopropyl)dodecylamine and N,N-bis(3-aminopropyl)tallow alkylamine, available as Triameen® Y12D and Triameen® YT (from Akzo Nobel);

ether group-containing aliphatic primary polyamines, especially bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, bis(3-aminopropyl)polytetrahydrofuranes and other polytetrahydrofuran diamines, cycloaliphatic ether group-containing diamines from the propoxylation and subsequent amination of 1,4-dimethylolcyclohexane, available especially as Jeffamine® RFD-270 (from Huntsman), as well as polyoxyalkylenedi- or -triamines, which are typically products from the amination of polyoxyalkylenedi- and -triols and for example are available under the name of Jeffamine® (from Huntsman), under the name of polyetheramine (from BASF) or under the name of PC Amines® (from Nitroil), especially Jeffamine® D-230, Jeffamine® D-400, Jeffamine® D-2000, Jeffamine® D-4000, Jeffamine® T-403, Jeffamine® T-3000, Jeffamine® T-5000, Jeffamine® EDR-104, Jeffamine® EDR-148 and Jeffamine® EDR-176, as well as corresponding amines from BASF or Nitroil;

primary diamines with secondary amine groups, such as especially 3-(2-aminoethyl)aminopropylamine, bis(hexamethylene)triamine (BHMT), diethylenetriamine (DETA), triethylenetetramine (TETA), tetraethylenepentamine (TEPA), pentaethylenehexamine (PEHA) and higher homologs of linear polyethyleneamines such as polyethylene polyamines with 5 to 7 ethyleneamine units (so-called "higher ethylenepolyamine," HEPA), products from the multiple cyanoethylation or cyanobutylation and subsequent hydrogenation of primary di- and polyamines with at least two primary amine groups, such as dipropylenetriamine (DPTA), N-(2-aminoethyl)-1,3-propanediamine (N3-amine), N,N'-bis(3-aminopropyl)ethylenediamine (N4-amine), N,N'-bis(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediamine or N,N'-bis(3-amino-1-ethylpropyl)-2-methyl-1,5-pentanediamine;

polyamines with one primary and at least one secondary amino group, such as especially N-butyl-1,2-ethanediamine, N-hexyl-1,2-ethanediamine, N-(2-ethylhexyl)-1,2-ethanediamine, N-cyclohexyl-1,2-ethanediamine, 4-aminomethyl-piperidine, N-(2-aminoethyl)piperazine, N-methyl-1,3-propanediamine, N-butyl-1,3-propanediamine, N-(2-ethylhexyl)-1,3-propanediamine, N-cyclohexyl-1,3-propanediamine, 3-methylamino-1-pentylamine, 3-ethylamino-1-pentylamine, 3-cyclohexylamino-1-pentylamine, fatty diamines such as N-cocoalkyl-1,3-propanediamine, products from the Michael-type addition reaction of primary aliphatic diamines with acrylonitrile, maleic or fumaric acid diesters, citraconic acid diesters, acrylic and methacrylic acid esters, acrylic and methacrylic acid amides and itaconic acid diesters, reacted in a 1:1 molar ratio, also products from the partial reductive alkylation of primary polyamines with aldehydes or ketones, especially N-monoalkylation products of the previously mentioned polyamines with two primary amine groups, especially of 1,6-hexanediamine, 1,5-diamino-2-methylpentane, 1,3-bis(aminomethyl)cyclohexane, 1,4-bis(aminomethyl)cyclohexane, 1,3-bis(aminomethyl)benzene, BHMT, DETA, TETA, TEPA, DPTA, N3-amine and N4-amine, wherein preferred alkyl groups are benzyl, isobutyl, hexyl and 2-ethylhexyl, as well as partially styrenated polyamines, especially the commercially available Gaskamine® 240 (from Mitsubishi Gas Chemical);

secondary diamines, such as especially N,N'-dialkylation products of the previously mentioned polyamines with two primary amine groups, especially N,N'-dialkylation products of 1,6-hexanediamine, 1,5-diamino-2-methylpentane, 1,3-bis(aminomethyl)cyclohexane, 1,4-bis(aminomethyl)-cyclohexane, 1,3-bis(aminomethyl)benzene, BHMT, DETA, TETA, TEPA, DPTA, N3-amine or N4-amine, wherein preferred alkyl groups are 2-phenylethyl, benzyl, isobutyl, hexyl and 2-ethylhexyl.

In one embodiment the curing agent described contains, as an additional polyamine with at least two amine hydrogens reactive toward epoxide groups, a polyamine with at least two primary aliphatic amine groups. A curing agent of this type makes it possible to obtain epoxy resin coatings with a particularly fast build-up of strength.

Preferably the polyamine with at least two primary aliphatic amine groups is selected from the group consisting of isophorone diamine, 1,3-bis(amino-methyl)cyclohexane, 1,4-bis(aminomethyl)cyclohexane, bis(4-amino-cyclohexyl)methane, bis(4-amino-3-methylcyclohexyl)methane, NBDA, TCD diamine, MXDA and ether group-containing polyamines with an average molecular weight of up to 500 g/mol. These polyamines are commercially available and make possible curing agents for epoxy resins that are free from particularly volatile amines.

Particularly preferred among these are the ether group-containing polyamines, especially Jeffamine® D-230 (from Huntsman) or corresponding amines from BASF or Nitroil, as well as Jeffamine® RFD-270 (from Huntsman). The ether group-containing polyamines make possible epoxy resin coatings with particularly low viscosity, rapid curing and high impact strength.

In an additional embodiment, the curing agent described contains, as another additional polyamine with at least two amine hydrogens reactive toward epoxide groups, at least one polyamine with at least one secondary amino group.

Preferred polyamines with at least one secondary amino group are N-monoalkylated and N,N'-dialkylated primary polyamines with two primary aliphatic amine groups and mixtures thereof, especially those obtained by reductive alkylation of primary polyamines with aldehydes or ketones and hydrogen. Here, aldehydes are preferred over ketones. In addition, the carbonyl groups of the aldehydes or ketones are used in stoichiometric or slightly substoichiometric proportions relative to the primary amine groups of the polyamine.

Additional preferred polyamines with at least one secondary amino group are products from the partial styrenation of primary diamines, especially Gaskamine® 240 (from Mitsubishi Gas Chemical).

Such a curing agent makes possible epoxy resin coatings with particularly low viscosity and particularly high impact strength.

Preferably the polyamine with at least one secondary amino group is selected from the group consisting of N-monoalkylated and NN-dialkylated 1,6-hexanediamine, 1,5-diamino-2-methylpentane, 1,3-bis(aminomethyl)-cyclohexane, 1,4-bis(aminomethyl)cyclohexane, 1,3-bis(aminomethyl)benzene, BHMT, DETA, TETA, TEPA, DPTA, N3-amine and N4-amine, with the alkyl group benzyl, 2-phenylethyl, isobutyl, hexyl or 2-ethylhexyl. Any desired combinations between the amines mentioned and the alkyl groups mentioned are possible.

These polyamines make possible epoxy resin products with particularly low viscosity, high surface quality and particularly high impact strength. Preferred among these are mono- and dibenzylated 1,3-bis(aminomethyl)-benzene, mono- and di-2-ethylhexylated 1,3-bis(aminomethyl)benzene and partially styrenated 1,3-bis(aminomethyl)benzene, such as especially Gaskamine® 240 (from Mitsubishi Gas Chemical). These arylaliphatic polyamines are particularly compatible with conventional commercial epoxy resins and make possible epoxy resin products with rapid build-up of strength and very high surface quality.

It may be advantageous if in addition to the adduct of TMD and cresyl glycidyl ethers, at least one polyamine with at least two primary aliphatic amine groups as well as a polyamine with at least one secondary amino group are present in the curing agent. Such curing agents make possible epoxy resin products with particularly low viscosity, rapid build-up of strength and especially high impact strength. Particularly preferred are combinations of ether group-containing polyamines with N-monoalkylated and/or N,N'-dialkylated primary diamines.

A preferred curing agent contains the adduct of TMD and cresyl glycidyl ether in a quantity such that 5 to 90%, preferably 10 to 80%, especially 15 to 70%, of the amine hydrogens reactive toward epoxide groups in the curing agent originate from the adduct. A curing agent of this type has a good balance between low viscosity, rapid curing and high impact strength.

The curing agent may also contain aromatic polyamines, especially m- and p-phenylenediamine, 4,4'-, 2,4' and 2,2'-diaminodiphenylmethane, 3,3'-dichloro-4,4'-diaminodiphenylmethane (MOCA), 2,4- and 2,6-tolylenediamine, mixtures of 3,5-dimethylthio-2,4- and -2,6-tolylenediamine (available as Ethacure® 300 from Albermarle), mixtures of 3,5-diethyl-2,4- and -2,6-tolylene diamine (DETDA), 3,3', 5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diamino diphenyl-sulfone (DDS), 4-amino-N-(4-aminophenyl)benzenesulfonamide, 5,5'-methylenedianthranilic acid, dimethyl-(5,5'-methylenedianthranilate), 1,3-propylene-bis(4-aminobenzoate), 1,4-butylene-bis(4-aminobenzoate), polytetramethylene oxide-bis(4-aminobenzoate) (available as Versalink® from Air Products), 1,2-bis(2-aminophenylthio)ethane, 2-methylpropyl-(4-chloro-3,5-diaminobenzoate) or tert.butyl-(4-chloro-3,5-diaminobenzoate).

The curing agent may also contain additional adducts, especially adducts of TMD with diepoxides or monoepoxides other than cresyl glycidyl ethers, or adducts of other primary diamines with mono- or diepoxides, as well as reaction products of amines and epichlorohydrin, especially those of 1,3-bis(aminomethyl)benzene, commercially available as Gaskamine® 328 (from Mitsubishi Gas Chemical).

The curing agent may also contain polyamidoamines which represent reaction products of a monohydric or polyhydric carboxylic acid or the ester or anhydride thereof, especially of a dimer fatty acid, and an aliphatic, cycloaliphatic or aromatic polyamine, especially a polyalkyleneamine such as DETA or TETA, especially the commercially available polyamidoamines Versamid® 100, 125, 140 and 150 (from Cognis), Aradur® 223, 250 and 848 (from Huntsman), Euretek® 3607 and 530 (from Huntsman) and Beckopox® EH 651, EH 654, EH 655, EH 661 and EH 663 (from Cytec), used in stoichiometric excess.

The curing agent may also contain phenalkamines, also called Mannich bases, which are reaction products of a Mannich reaction of phenols, especially cardanol, with aldehydes, especially formaldehyde, and polyamines, especially the commercially available phenalkamines Cardolite® NC-541, NC-557, NC-558, NC-566, Lite 2001 and Lite 2002 (from Cardolite), Aradur® 3440, 3441, 3442 and 3460 (from Huntsman) and Beckopox® EH 614, EH 621, EH 624, EH 628 and EH 629 (from Cytec).

The curing agent may also contain monoamines such as hexylamine and benzylamine.

The curing agent may also contain mercapto group-containing compounds, especially the following:

liquid mercaptan-terminated polysulfide polymers, known under the trade name of Thiokol® (from Morton Thiokol; for example available from SPI Supplies, or from Toray Fine Chemicals), especially the types LP-3, LP-33, LP-980, LP-23, LP-55, LP-56, LP-12, LP-31, LP-32 and LP-2; and also known under the trade name of Thioplast® (from Akzo Nobel), especially the types G 10, G 112, G 131, G 1, G 12, G 21, G 22, G 44 and G 4;

mercaptan-terminated polyoxyalkylene ethers, available for example by reacting polyoxyalkylenedi- and -triols either with epichlorohydrin or with an alkylene oxide, followed by sodium hydrogen sulfide;

mercaptan-terminated compounds in the form of polyoxyalkylene derivatives, known under the trade name of Capcure® (from Cognis), especially the types WR-8, LOF and 3-800;

polyesters of thiocarboxylic acids, for example pentaerythritol tetramercapto-acetate, trimethylolpropane trimercaptoacetate, glycol di mercaptoacetate, pentaerythritol tetra-(3-mercaptopropionate), trimethylolpropane-tri-(3-mercaptopropionate) and glycoldi-(3-mercaptopropionate), as well as the esterification products of polyoxyalkylene diols and triols, ethoxylated trimethylolpropane and polyester diols with thiocarboxylic acids such as thioglycolic acid and 2- or 3-mercaptopropionic acid; and additional mercapto group-containing compounds, especially 2,4,6-trimercapto-1,3,5-triazine, 2,2'-(ethylenedioxy)-diethanethiol (triethylene glycol dimercaptan) and ethanedithiol.

The curing agent may also contain at least one accelerator. Suitable accelerators are substances that promote the reaction between amine groups and epoxide groups, especially acids or compounds hydrolyzable to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic acid esters, other organic or inorganic acids, such as especially phosphoric acid, or mixtures of the aforementioned acids and acid esters; furthermore tertiary amines such as especially 1,4-diazabicyclo[2.2.2]octane, benzyldimethylamine, α-methylbenzyl dimethylamine, triethanolamine, dimethylamino propylamine, imidazoles such as especially N-methylimidazole, N-vinylimidazole or 1,2-dimethylimidazole, salts of such tertiary amines, quaternary ammonium salts such as especially benzyltrimethyl ammonium chloride, amidines such as especially 1,8-diazabicyclo[5.4.0]undec-7-ene, guanidines such as especially 1,1,3,3-tetramethylguanidine, phenols, especially bisphenols, phenol resins, and Mannich bases such as especially 2-(dimethylaminomethyl)phenol, 2,4,6-tris(dimethylaminomethyl)phenol and polymers of phenol, formaldehyde and N,N-dimethyl-1,3-propanediamine, phosphites such as especially di- and tri-phenylphosphites, as well as mercapto group-containing compounds.

Preferred accelerators are acids, tertiary amines or Mannich bases. Particularly preferred are salicylic acid and/or 2,4,6-tris(dimethylaminomethyl)phenol.

The curing agent may also contain at least one non-reactive diluent, especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol-monomethyl ether, diethylene glycol-monoethyl ether, diethylene glycol-mono-n-butyl ether, diethylene glycol dimethyl ether, diethylene glycol diethyl ether, diethylene glycoldi-n-butylyl ether, propylene glycol butyl ether, propylene glycol phenyl ether, dipropylene glycol, dipropylene glycol monomethyl ether, dipropylene glycol dimethyl ether, dipropylene glycoldi-n-butyl ether, N-methylpyrrolidone, diphenylmethane, diisopropylnaphthalene, petroleum fractions such as Solvesso® types (from Exxon), alkylphenols such as tert.butylphenol, nonylphenol, dodecylphenol and 8,11,14-pentadecatrienylphenol (cardanol, or cashew nut shell liquid, available for example as Cardolite NC-700 from Cardolite Corp., USA), styrenated phenol, bisphenols, aromatic hydrocarbon resins, especially phenol group-containing types, alkoxylated phenol, especially ethoxylated or propoxylated phenol, especially 2-phenoxyethanol, adipates, sebacates, phthalates, benzoates, organic phosphoric or sulfonic acid esters or sulfonamides. Preferred are benzyl alcohol, dodecylphenol, tert.butylphenol, styrenated phenol, ethoxylated phenol or phenol group-containing aromatic hydrocarbon resins, especially the Novares®-types LS 500, LX 200, LA 300 and LA 700 (from Rütgers).

Preferably the curing agent contains no or only a small amount of non-reactive diluents, particularly preferably less than 25 wt.-%, especially less than 10 wt.-% and most preferably less than 5 wt.-%. In particular, no non-reactive diluents are added to the curing agent.

An additional object of the invention is an epoxy resin composition containing at least one epoxy resin and the previously described curing agent.

The usual commercial epoxy resins are suitable as epoxy resins. These are obtained in known ways, for example from the oxidation of the corresponding olefins or from the reaction of epichlorohydrin with the corresponding polyols, polyphenols or amines.

Particularly suitable epoxy resins include so-called polyepoxide liquid resins, hereinafter referred to as "liquid resin". These have a glass transition temperature below 25° C.

Other suitable epoxy resins include so-called solid resins which have a glass transition temperature above 25° C. and can be comminuted to powders that are free-flowing at 25° C.

Suitable epoxy resins are in particular aromatic epoxy resins, in particular the glycidylization products of:
bisphenol A, bisphenol F or bisphenol A/F, where A represents acetone and F represents formaldehyde, which served as starting materials for the preparation of these bisphenols. In the case of bisphenol F, positional isomers can be present as well, in particular derived from 2,4'- and 2,2'-hydroxyphenylmethane.
dihydroxybenzene derivatives, such as resorcinol, hydroquinone and pyrocatechol;
other bisphenols or polyphenols, such as bis-(4-hydroxy-3-methylphenyl)-methane, 2,2-bis-(4-hydroxy-3-methylphenyl)-propane (bisphenol C), bis-(3,5-dimethyl-4-hydroxyphenyl)-methane, 2,2-bis-(3,5-dimethyl-4-hydroxyphenyl)-propane, 2,2-bis-(3,5-dibromo-4-hydroxyphenyl)-propane, 2,2-bis-(4-hydroxy-3-tert-butylphenyl)-propane, 2,2-bis-(4-hydroxyphenyl)-butane (bisphenol B), 3,3-bis-(4-hydroxyphenyl)-pentane, 3,4-bis-(4-hydroxyphenyl)-hexane, 4,4-bis-(4-hydroxyphenyl)-heptane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane (bisphenol Z), 1,1-bis-(4-hydroxyphenyl)-3,3,5-trimethylcyclohexane (Bisphenol TMC), 1,1-bis-(4-hydroxyphenyl)-phenylethane, 1,4-bis-[2-(4-hydroxyphenyl)-2-propyl]benzene (bisphenol P), 1,3-bis-[2-(4-hydroxyphenyl)-2-propyl]benzene (bisphenol M), 4,4'-dihydroxydiphenyl (DOD), 4,4'-di-hydroxybenzophenone, bis-(2-hydroxynaphth-1-yl)-methane, bis-(4-hydroxynaphth-1-yl)-methane, 1,5-dihydroxynaphthalene, tris-(4-hydroxyphenyl)-methane, 1,1,2,2-tetrakis-(4-hydroxyphenyl)-ethane, bis-(4-hydroxyphenyl)-ether or bis-(4-hydroxyphenyl)-sulfone;
condensation products of phenols with formaldehyde which are obtained under acid condition, such as phenol novolacs or cresol novolacs, also known as bisphenol F novolacs;
aromatic amines such as aniline, toluidine, 4-aminophenol, 4,4'-methylenediphenyldiamine, 4,4'-methylenediphenyldi-(N-methyl)-amine, 4,4'-[1,4-phenylene-bis-(1-methylethylidene)]-bisaniline (Bisaniline P), 4,4'-[1,3-phenylene-bis-(1-methylethylidene)]-bisaniline (Bisaniline M).

Other suitable epoxy resins include aliphatic or cycloaliphatic polyepoxides, in particular
glycidyl ethers of saturated or unsaturated, branched or unbranched, cyclic or open-chain di-, tri- or tetra-functional $C_2$ to $C_{30}$ alcohols, in particular ethylene glycol, propylene glycol, butylene glycol, hexanediol, octanediol, polypropylene glycols, dimethylolcyclohexane, neopentylglycol, dibromo-neopentyl glycol, castor oil, trimethylolpropane, trimethylolethane, pentaerythritol, sorbitol or glycerol, as well as alkoxylated glycerol or alkoxylated trimethylolpropane;
a hydrogenated bisphenol A, F or NF liquid resin, or the glycidylization products of hydrogenated bisphenol A, F, or NF;
an N-glycidyl derivative of amides or heterocyclic nitrogen bases, such as triglycidyl cyanurate and triglycidyl isocyanurate, as well as reaction products of epichlorohydrin and hydantoin.
epoxy resins from the oxidation of olefins, such as in particular vinylcylohexene, dicyclopentadiene, cyclohexadiene, cyclododecadiene, cyclododecatriene, isoprene, 1,5-hexadiene, butadiene, polybutadiene, or divinylbenzene.

Preferably, the epoxy resin is a liquid resin based on a bisphenol, in particular a diglycidyl ether of bisphenol A, bisphenol F or bisphenol NF, commercially available, for example, from Dow, Huntsman, and Hexion. As epoxy resins, these liquid resins have a low viscosity and in the cured state exhibit good properties as a coating. Optionally they may be present in combination with bisphenol A solid resin or bisphenol F novolac epoxy resin.

The epoxy resin may contain a reactive diluent, in particular a reactive diluent having at least one epoxide group. Suitable reactive diluents include, for example, the glycidyl ethers of mono- or polyhydric phenols or aliphatic or cycloaliphatic alcohols, such as in particular polyglycidyl ethers of diols or polyols already mentioned above, and furthermore in particular phenyl glycidyl ether, cresyl glycidyl ether, benzyl glycidyl ether, p-n-butyl-phenyl glycidyl ether, p-tert.butyl-phenyl glycidyl ether, nonyl phenyl glycidyl ether, allyl glycidyl ether, butyl glycidyl ether, hexyl glycidyl ether, 2-ethylhexyl glycidyl ether, as well as glycidyl ethers of natural alcohols, such as, for example, $C_8$ to $C_{10}$ alkyl glycidyl ethers, or $C_{12}$ to $C_{14}$ alkyl glycidyl ethers. The addition of a reactive diluent to the epoxy resin effects a reduction in viscosity as well as a reduction in glass transition temperature and mechanical parameters.

Optionally, the epoxy resin composition contains other components, in particular auxiliaries and additives commonly used in epoxy resin compositions, for example the following:

- solvents, diluents, film-forming agents or extenders, such as in particular the non-reactive diluents already mentioned above;
- reactive diluents, in particular reactive diluents having epoxide groups, such as those mentioned above, epoxidized soybean oil or linseed oil, compounds having acetoacetate groups, in particular acetoacetylated polyols, butyrolactone, carbonates, aldehydes, and furthermore isocyanates and silicones having reactive groups;
- polymers, in particular polyamides, polysulfides, polyvinyl formal (PVF), polyvinyl butyral (PVB), polyurethanes (PUR), polymers having carboxyl groups, polyamides, butadiene-acrylonitrile copolymers, styrene-acrylonitrile copolymers, butadiene-styrene copolymers, homo- or copolymers of unsaturated monomers, in particular from the group comprising ethylene, propylene, butylene, isobutylene, isoprene, vinyl acetate and alkyl-(meth)acrylates, in particular chlorosulfonated polyethylenes and fluorine-containing polymers, sulfonamide-modified melamines and purified montan waxes;
- inorganic and organic fillers, for example, ground or precipitated calcium carbonates, which are optionally coated with fatty acids, in particular stearates, barite (heavy spar), talcs, powdered quartz, silica sand, iron mica, dolomite, wollastonite, kaolin, mica (potassium aluminum silicate), molecular sieves, aluminum oxides, aluminum hydroxides, magnesium hydroxide, silicas, cements, gypsums, fly ashes, carbon black, graphite, metal powders such as aluminum, copper, iron, zinc, silver or steel, PVC powder or hollow spheres;
- fibers, in particular glass fibers, carbon fibers, metal fibers, ceramic fibers or plastic fibers such as polyamide fibers or polyethylene fibers;
- pigments, in particular titanium dioxide and iron oxides;
- the accelerators mentioned above;
- rheology modifiers, in particular thickeners or anti-setting agents;
- adhesion promoters, in particular organo alkoxysilanes;
- stabilizers against oxidation, heat, light and UV radiation;
- flame-retardant substances, in particular aluminum hydroxide (ATH), magnesium dihydroxide (MDH), antimony trioxide, antimony pentoxide, boric acid $(B(OH)_3)$, zinc borate, zinc phosphate, melamine borate, melamine cyanurate, ammonium polyphosphate, melamine phosphate, melamine pyrophosphate, polybrominated diphenyl oxides or diphenyl ethers, phosphates, such as in particular diphenyl cresyl phosphate, resorcinol-bis-(diphenylphosphate), resorcinol-diphosphate-oligomers, tetraphenylresorcinol diphosphite, ethylenediamine diphosphate and bisphenol A-bis-(diphenylphosphate), tris-(chloroethyl)-phosphate, tris-(chloropropyl)-phosphate and tris-(dichloroisopropyl)-phosphate, tris-[3-bromo-2,2-bis-(bromomethyl)-propyl]-phosphate, tetrabromo-bisphenol A, bis-(2,3-dibromopropyl ether) of bisphenol A, brominated epoxy resins, ethylene-bis-(tetrabromophthalimide), ethylene-bis-(dibromonorbornane dicarboximide), 1,2-bis-(tribromophenoxy)-ethane, tris-(2,3-dibromopropyl)-isocyanurate, tribromophenol, hexabromocyclododecane, bis-(hexachlorocyclopentadieno)-cyclooctane and chloroparaffins;
- surface-active substances, in particular wetting agents, leveling agents, deaerating agents, and/or defoamers;
- biocides, such as algicides, fungicides or fungal growth inhibiting substances.

Preferably, the epoxy resin composition further contains other auxiliaries and additives, in particular wetting agents, leveling agents, defoamers, stabilizers, pigments and catalysts, in particular salicylic acid or 2,4,6-tris-(dimethylaminomethyl)-phenol.

Preferably, the epoxy resin composition contains no or only a low content of non-reactive diluents, particularly preferably less than 10% by weight, in particular less than 5% by weight, most preferably less than 2% by weight.

In the epoxy resin composition, the ratio of the number of epoxide group-reactive groups to the number of epoxide groups preferably ranges from 0.5:1.0 to 1.5:1.0, in particular 0.7:1.0 to 1.2:1.0.

The amine hydrogens present in the epoxy resin composition and any optionally present additional epoxide group-reactive groups react with the epoxide groups under ring opening thereof (addition reaction). As a result of these reactions the composition polymerizes and ultimately cures. The skilled person knows that primary amino groups are difunctional with respect to epoxide groups and one primary amino group thus counts as two epoxide group-reactive groups.

In particular, the epoxy resin composition is a two-component composition, consisting of
(i) a resin component containing at least one epoxy resin, and
(ii) a curing agent component containing the curing agent described above.

The components of the two-component composition are each stored in a separate container. Other components of the two-component epoxy resin composition can be present as part of the resin or the curing agent component, wherein other epoxide group-reactive components are preferably constituents of the curing agent component. A suitable container for storing the resin or curing agent component is in particular a barrel, a hobbock, a bag, a bucket, a can, a cartridge or a tube. The components can be stored, which means that before they are used they can be stored for several months to a year or more without their properties changing to an extent that is relevant to their use.

When applying the two-component epoxy resin composition, the resin and the curing agent component are mixed together just before or during application. The mixing ratio between the two components is preferably chosen such that the epoxide group-reactive groups of the curing agent component are in an appropriate ratio to the epoxide groups of the resin component, as described above. In parts by weight, the mixing ratio between the resin component and the curing agent component usually ranges from 1:10 to 10:1.

The mixing of the two components is carried out by a suitable method; it may be continuous or batchwise. If the mixing is carried out prior to application, care must be taken that not too much time passes between the mixing of the components and the application, as this may lead to failures, such as, for example, slow or incomplete development of adhesion to the substrate. The mixing takes place in particular at ambient temperature, which typically ranges from about 5 to 50° C., preferably from about 10 to 30° C.

Upon mixing of the two components, the curing begins by chemical reaction, as described above. Curing takes place in particular at ambient temperature. Typically, it extends over several days or weeks until it is largely completed under the given conditions. The time depends, inter alia, on the temperature, the reactivity of the components and their stoichiometry, and the presence of accelerators.

Another object of the invention is thus also a cured composition obtained from the curing of an epoxy resin composition as described in the present document.

The epoxy resin composition is applied to at least one substrate, the following being particularly suitable:
  glass, glass ceramic, concrete, mortar, brick, tile, gypsum and natural stones such as granite or marble;
  metals and alloys, such as aluminum, iron, steel and nonferrous metals, including surface-coated metals and alloys such as zinc- and chrome-plated metals;
  leather, textiles, paper, wood, wood materials bonded with resins, for example, phenolic, melamine or epoxy resins, resin-textile composites and other so-called polymer composites;
  plastics, in particular hard and soft PVC, ABS, polycarbonate (PC), polyamide (PA), polyester, PMMA, epoxy resins, PUR, POM, PO, PE, PP, EPM and EPDM, wherein the plastics are optionally surface-treated by plasma, corona or flames;
  fiber-reinforced plastics such as carbon fiber-reinforced plastics (CFRP), glass fiber-reinforced plastics (GRP) and sheet molding compounds (SMC);
  coated substrates such as powder-coated metals or alloys; paints and varnishes.

The substrates may be pretreated prior to application of the epoxy resin composition, if necessary. Such pretreatments include in particular physical and/or chemical cleaning methods, for example, grinding, sand blasting, shot blasting, brushing and/or blowing, and furthermore treating with cleaning agents or solvents, or the application of an adhesion promoter, an adhesion promoter solution or a primer.

The epoxy resin composition described can be used advantageously as a fiber composite material (composite), grouting, sealant, adhesive, coating, plating, paint, varnish, sealer, undercoat or primer.

In particular, it can be used as a grouting, sealant and adhesive, such as, for example, as a potting compound, sealant, vehicle body adhesive, sandwich panel adhesive, half-shell adhesive, for example for rotor blades of wind power plants, bridge element adhesive, or anchoring adhesive; and furthermore as covering, coating, paint, varnish, sealer, undercoat and primer for construction and industrial applications, such as, in particular, as floor covering and floor coating for interiors such as offices, industrial halls, gymnasiums or cold rooms, or outdoors for balconies, terraces, parking decks, bridges or roofs, as a protective coating for concrete, cement, metals, plastics or wood, for example for surface sealing of wooden structures, vehicles, loading platforms, tanks, silos, wells, ducts, pipelines, machinery or steel structures, for example, of ships, piers, offshore platforms, lock gates, hydroelectric plants, river works, swimming pools, wind power plants, bridges, chimneys, cranes or sheet pilings; and furthermore as prime coat, finishing, corrosion protection primer or for making surfaces hydrophobic. Another coating, another covering or another paint can be applied to the fully or partially cured epoxy resin composition, in particular, when used as a coating, covering or paint, wherein this further layer may likewise be an epoxy resin composition, but also another material, in particular a polyurethane or polyurea coating.

Particularly advantageously the epoxy resin composition described can be used as a coating. In this context, coatings mean flat covers of all kinds, in particular paints, varnishes, sealers, undercoats and primers, as described above. Particularly advantageously the epoxy resin composition described can be used in low-emission epoxy resin products with eco-certification, for example according to Emicode (EC1 Plus), AgBB, DIBt, Der Blaue Engel, AFSSET, RTS (M1) and US Green Building Council (LEED).

The epoxy resin composition is advantageously used as a coating in a method of coating, wherein it has a liquid consistency with a low viscosity and good leveling properties and can be applied in particular as a self-leveling coating to predominantly flat surfaces or as a paint. Preferably, in this application the epoxy resin composition immediately after mixing of the resin and the curing agent component has a viscosity, measured at 20° C., ranging from 300 to 3,000 mPa·s, preferably ranging from 300 to 2,000 mPa·s, particularly preferably ranging from 300 to 1,500 mPa·s. Within the processing time, the mixed composition is applied flat as a thin film to a substrate with a layer thickness of typically about 50 μm to about 5 mm, typically at ambient temperature. The application is effected in particular by pouring onto the substrate to be coated and subsequent uniform distribution using, for example, a squeegee or a serrated trowel. The application can also be effected with a brush or roller or as a spray application, for example as corrosion protection coating on steel.

Upon curing, typically largely clear, glossy and non-sticky films of high hardness form, which have good adhesion to various substrates.

Another object of the invention is an article containing a cured composition obtained by curing of the epoxy resin composition described above. The cured composition is present in particular in the form of a coating.

The epoxy resin composition described is characterized by advantageous properties. It has low viscosity and cures even under moist, cold conditions quickly and largely without blushing effects, thereby making available clear, non-sticky films of high hardness and surface quality, in particular remarkably high luster with low tendency to yellowing under influence of light, even with small proportions or completely without the use of non-reactive diluents and particularly also with only small proportions or completely without the use of volatile, intensely odoriferous amines. The epoxy resin composition described makes available low-emission epoxy resin products that meet the requirements for many eco-certifications and at the same time meet high standards in terms of safety, processing and use characteristics.

EXAMPLES

Exemplary embodiments are shown below, which are intended to illustrate the invention described in more detail. Of course, the invention is not limited to the exemplary embodiments described.
"ANEW" stands for the amine hydrogen equivalent weight.
"EEW" stands for the epoxide equivalent weight.

1. Description of the Measurement Methods

The viscosity was measured on a Rheotec RC30 cone-plate viscometer with thermostat (cone diameter 50 mm, cone angle 1°, cone tip-plate distance 0.05 mm, shear rate 10 s$^{-1}$).

2. Commercial Substances Used:

| | |
|---|---|
| Araldite ® DY-K | (from Huntsman), cresyl glycidyl ether, EEW approx. 182 g/Eq |
| Araldite ® GY 250 | (from Huntsman), bisphenol A diglycidyl ether, EEW approx. 187.5 g/Eq |
| Araldite ® DY-E | (from Huntsman), monoglycidyl ether of $C_{12}$ to $C_{14}$ alcohols, EEW approx. 290 g/Eq |
| Ancamine ® K 54 | (from Air Products), 2,4,6-tris(dimethylaminomethyl)phenol |
| Vestamin ® TMD | (from Evonik), 2,2,4- and 2,4,4-trimethylhexamethylene-diamine, AHEW 39.6 g/Eq |
| Dytek ® A | (from Invista), 1,5-diamino-2-methylpentane, AHEW 29.0 g/Eq |
| Vestamin ® IPD | (from Evonik), 3-aminomethyl-3,5,5-trimethyl-cyclohexyldiamine (isophorone diamine), AHEW 42.6 g/Eq |
| 1,3-BAC | (from Mitsubishi Gas Chemical), 1,3-bis(aminomethyl)cyclohexane, AHEW 35.5 g/Eq |
| MXDA | (from Mitsubishi Gas Chemical), 1,3-bis(aminomethyl)-benzene |
| Gaskamine ® 240 | (from Mitsubishi Gas Chemical), styrenated 1,3-bis(aminomethyl)benzene, AHEW approx. 103 g/Eq |
| Jeffamine ® D-230 | (from Huntsman), polyoxypropylenediamine with average molecular weight of approx. 240 g/mol, AHEW 60 g/Eq |
| Jeffamine ® RFD-270 | (from Huntsman), cycloaliphatic ether group-containing diamine from the propoxylation and subsequent amination of 1,4-dimethylol-cyclohexane, average molecular weight approx. 270 g/mol, AHEW 67 g/Eq |

3. Preparation of Adducts:

Adduct A-1:

165.7 g (1.05 mol) Vestamin® TMD were placed in a vessel and heated. Under a nitrogen atmosphere and good stirring, at a temperature of 80° C. over a period of 2 hours, 182.0 g (1.00 mol) Araldite® DY-K were added slowly, making sure that the temperature of the reaction mixture did not rise above 85° C. The reaction mixture was allowed to stand for 2 hours at 80° C., then cooled to 23° C., closed, and stored. A clear, slightly yellowish liquid with a viscosity of 9.7 Pa·s, an amine number of 341.5 mg KOH/g and a theoretical AHEW of approx. 109.1 g/Eq was obtained.

Adduct A-2:

As described for adduct A-1, 186.1 g (1.18 mol) Vestamin® TMD were reacted with 182.0 g (1.00 mol) Araldite® DY-K. A clear, slightly yellowish liquid with a viscosity of 4.8 Pa·s, an amine number of 361.8 mg KOH/g and a theoretical AHEW of approx. 99.4 g/Eq was obtained.

Adduct A-3:

As described for adduct A-1, 186.1 g (1.10 mol) Vestamin® TMD were reacted with 182.0 g (1.00 mol) Araldite® DY-K. A clear, slightly yellowish liquid with a viscosity of 6.9 Pa·s, an amine number of 351.3 mg KOH/g and a theoretical AHEW of approx. 104.2 g/Eq was obtained.

Adduct A-4: (Comparison)

As described for adduct A-1, 116.0 g (1.00 mol) Dytek® A were reacted with 200.2 g (1.10 mol) Araldite® DY-K. A clear, slightly yellowish liquid with a viscosity of 13.1 Pa·s, an amine number of 355 mg KOH/g and a theoretical AHEW of approx. 109.1 g/Eq was obtained.

Adduct A-5: (Comparison)

As described for adduct A-1, 116.0 g (1.00 mol) Dytek® A was reacted with 182.0 g (1.00 mol) Araldite® DY-K. A clear, slightly yellowish liquid with a viscosity of 5.8 Pa·s, an amine number of 377 mg KOH/g and a theoretical AHEW of approx. 99.4 g/Eq was obtained.

Adduct A-6: (Comparison)

As described for adduct A-1, 127.6 g (1.10 mol) Dytek® A was reacted with 182.0 g (1.00 mol) Araldite® DY-K. A clear, slightly yellowish liquid with a viscosity of 3.1 Pa·s, an amine number of 401 mg KOH/g and a theoretical AHEW of approx. 91.1 g/Eq was obtained.

Adduct A-7: (Comparison)

As described for adduct A-1, 187.4 g (1.10 mol) Vestamin® IPD was reacted with 182.0 g (1.00 mol) Araldite® DY-K. A clear, slightly yellowish, highly viscous liquid with a viscosity, measured at 40° C., of 17.5 Pa·s, an amine number of 340 mg KOH/g and a theoretical AHEW of approx. 108.7 g/Eq was obtained.

Adduct A-8: (Comparison)

As described for adduct A-1, 156.4 g (1.10 mol) 1,3-BAC was reacted with 182.0 g (1.00 mol) Araldite® DY-K. A clear, slightly yellowish liquid with a viscosity of 59.4 Pa·s, an amine number of 369 mg KOH/g and a theoretical AHEW of approx. 99.5 g/Eq was obtained.

4. Preparation of Hydrogenated Amines

Benzylated MXDA:

In a round-bottom flask, 17.0 g (0.16 mol) benzaldehyde and 13.6 g (0.10 mol) MXDA were dissolved under a nitrogen atmosphere in a sufficient quantity of isopropanol. The solution was stirred for 30 minutes at 23° C. and then hydrogenated at a hydrogen pressure of 80 bar, a temperature of 80° C. and a flow rate of 3 ml/min on a continuously operating hydrogenation apparatus with Pd/C-fixed-bed catalyst. To follow the progress of the reaction, IR spectroscopy was used to check whether the imine band at approx. 1665 cm$^{-1}$ had disappeared. Then the solution was concentrated under vacuum at 80° C. The product obtained was a clear, yellowish oil with a viscosity of 0.1 Pa·s at 20° C., an amine number of 416.8 mg KOH/g and a theoretical AHEW of approx. 115.5 g/Eq.

Ethylhexylated MXDA:

In the same manner as for the benzylated MXDA, 25.6 g (0.20 mol) 2-ethylhexanal and 13.6 g (0.10 mol) MXDA were reacted. A clear, slightly yellowish liquid with a viscosity of 140 mPa·s at 20° C., an amine number of 308.6 mg KOH/g and a theoretical AHEW of approx. 180.3 g/Eq was obtained.

5. Preparation of Curing Agents and Epoxy Resin Compositions

For each example, the constituents shown in Tables 1 to 4 were mixed in the indicated quantities (in parts by weight) of the curing agent component using a centrifugal mixer (SpeedMixer™ DAC 150, FlackTek Inc.) and stored with exclusion of moisture.

Similarly, the constituents of the resin component shown in Tables 1 to 4 were processed and stored.

Then the two components of each composition were processed using the centrifugal mixer into a homogenous liquid which was tested immediately thereafter as follows:

10 minutes after mixing, the viscosity was determined at 20° C. ("viscosity (10')").

A first film was drawn in a layer thickness of 500 μm on a glass plate and held at 23±1° C. and 50±5% relative humidity (=standard climate, abbreviated as "SC" in the following), or cured. The König hardness (pendulum hardness according to König, measured according to DIN EN ISO 1522) of this film was determined after 2 days ("König hardness (SC) (2d)"), after 4 days ("König hardness (SC) (4d)"), after 7 days ("König hardness (SC) (7d)") and either after 4 weeks ("König hardness (SC) (4w)") or after 14 days ("König hardness (SC) (14d)"). After 14 days the appearance of the film was assessed (designated in the table as "Appearance (SC)"). The designation "good" was applied to a film that was clear and had a glossy, non-sticky, non-structured surface. The term "structure" is applied to any kind of marking or pattern on the surface.

A second film was drawn at a layer thickness of 500 μm on a glass plate, and this was stored immediately after application for 7 days at 8° C. and 80% relative humidity and then for 3 weeks under SC, or cured. 24 hours after the application, a polypropylene bottle cap was placed on the film, and a damp sponge piece was placed under the cap. After an additional 24 hours, the sponge piece and the cap were removed and placed at a new location on the film, from which it was removed after 24 hours and moved to a new place, for a total of 4 times. Then the appearance of this film was assessed (designated in the tables as "Appearance (8°/80%)"), in the manner described for the appearance (SC). Here also the number of marks visible on the film due to the damp sponge piece and/or the covering cap was reported. Again, the Konig hardness was determined for the films thus cured, in each case after 7 days at 8° C. and 80% relative humidity ("Kónig hardness (7d 8°/80%)"), then after an additional 2 days under SC ("König hardness (+2d SC)"), 7 days under SC ("König hardness (+7d SC)") and in some instances also after 3 weeks under SC ("König hardness (+3w SC)").

The results are given in Tables 1 to 4.

The epoxy resin compositions EZ-1 to EZ-13 are examples according to the invention. The epoxy resin compositions Ref-1 to Ref-11 are comparison examples.

TABLE 1

Composition and properties of EZ-1 to EZ-3 and Ref-1 to Ref-3.

| Example | | EZ-1 | Ref-1 | EZ-2 | Ref-2 | EZ-3 | Ref-3 |
|---|---|---|---|---|---|---|---|
| Resin comp.: | | | | | | | |
| Araldite ® GY-250 | | 167.2 | 167.2 | 167.2 | 167.2 | 167.2 | 167.2 |
| Araldite ® DY-E | | 31.8 | 31.8 | 31.8 | 31.8 | 31.8 | 31.8 |
| curing agent-comp. | | | | | | | |
| adduct | | A-1 | A-4 | A-1 | A-4 | A-1 | A-4 |
| | | 109.1 | 109.1 | 65.5 | 65.5 | 65.5 | 65.5 |
| Jeffamine ® D-230 | | — | — | 24.0 | 24.0 | — | — |
| Jeffamine ® RFD-270 | | — | — | — | — | 26.8 | 26.8 |
| Ancamine ® K 54 | | 6.2 | 6.2 | 5.8 | 5.8 | 5.8 | 5.8 |
| Viscosity (10') [Pa · s] | | 3.5 | 4.1 | 1.2 | 1.4 | 1.7 | 2.2 |
| König | (2 d SC) | 158 | 172 | 154 | 131 | 186 | 179 |
| hardness | (4 d SC) | 179 | 192 | 189 | 143 | 206 | 192 |
| [s] | (7 d SC) | 185 | 202 | 204 | 192 | 218 | 209 |
| | (4 w SC) | 208 | 209 | 213 | 210 | 217 | 215 |
| Appearance (SC) | | good, high gloss | sl. schlieren, poor gloss | good, high gloss | sl. structure, little gloss | good, high gloss | good, high gloss |
| König | (7 d 8°/80%) | 62 | 68 | 49 | 55 | 73 | 78 |
| hardness | (+2 d SC) | 160 | 165 | 164 | 150 | 180 | 175 |
| [s] | (+7 d SC) | 183 | 192 | 204 | 189 | 210 | 189 |
| | (+3 w SC) | 203 | 206 | 208 | 201 | 212 | 204 |
| Appearance (8°/80%) No. of markings | | good, high gloss; none | sl. dull, little gloss; 1 | good, high gloss; 1 | sl. structure, little gloss; 1 | good, high gloss; none | sl. dull, little gloss; 1 |

"sl." stands for "slight(ly)"

TABLE 2

Composition and properties of EZ-4 to EZ-6 and Ref-4 to Ref-6.

| Example | EZ-4 | Ref-4 | EZ-5 | Ref-5 | EZ-6 | Ref-6 |
|---|---|---|---|---|---|---|
| Resin comp.: | | | | | | |
| Araldite ® GY-250 | 167.2 | 167.2 | 167.2 | 167.2 | 167.2 | 167.2 |
| Araldite ® DY-E | 31.8 | 31.8 | 31.8 | 31.8 | 31.8 | 31.8 |
| curing agent-comp. | | | | | | |
| adduct | A-2 | A-5 | A-2 | A-5 | A-2 | A-5 |
| | 99.4 | 99.4 | 59.6 | 59.6 | 59.6 | 59.6 |
| Jeffamine ® D-230 | — | — | 24.0 | 24.0 | — | — |
| Jeffamine ® RFD-270 | — | — | — | — | 26.8 | 26.8 |
| Ancamine ® K 54 | 6.0 | 6.0 | 5.7 | 5.7 | 5.7 | 5.7 |
| Viscosity (10') [Pa · s] | 2.7 | 3.1 | 1.1 | 1.1 | 1.6 | 1.6 |

TABLE 2-continued

Composition and properties of EZ-4 to EZ-6 and Ref-4 to Ref-6.

| Example | | EZ-4 | Ref-4 | EZ-5 | Ref-5 | EZ-6 | Ref-6 |
|---|---|---|---|---|---|---|---|
| König | (2 d SC) | 164 | 186 | 161 | 150 | 186 | 182 |
| hardness | (4 d SC) | 176 | 199 | 189 | 163 | 206 | 202 |
| [s] | (7 d SC) | 186 | 209 | 201 | 189 | 215 | 212 |
|  | (4 w SC) | 203 | 215 | 209 | 210 | 216 | 214 |
| Appearance (SC) | | good, high gloss | slightly dull little gloss | good, high gloss | slight structure, little gloss | good, high gloss | sl. cloudy, little gloss |
| König | (7 d 8°/80%) | 64 | 73 | 52 | 49 | 67 | 76 |
| hardness | (+2 d SC) | 155 | 161 | 158 | 148 | 178 | 167 |
| [s] | (+7 d SC) | 197 | 180 | 186 | 172 | 196 | 189 |
|  | (+3 w SC) | 201 | 202 | 201 | 199 | 204 | 209 |
| Appearance (8°/80%) No. of markings | | slightly dull little gloss; 1 | slightly dull little gloss; 1 | good, high gloss; 1 | slightly dull little gloss; 1 | good, high gloss; none | slightly dull little gloss; none |

"sl." stands for "slight(ly)"

TABLE 3

Composition and properties of EZ-7 to EZ-12 and Ref-7 and Ref-8.

| Example | | EZ-7 | Ref-7 | EZ-8 | Ref-8 | EZ-9 | EZ-10 | EZ-11 | EZ-12 |
|---|---|---|---|---|---|---|---|---|---|
| Resin comp.: | | | | | | | | | |
| Araldite ® GY-250 | | 167.2 | 167.2 | 167.2 | 167.2 | 167.2 | 167.2 | 167.2 | 167.2 |
| Araldite ® DY-E | | 31.8 | 31.8 | 31.8 | 31.8 | 31.8 | 31.8 | 31.8 | 31.8 |
| Curing agent-comp.: | | | | | | | | | |
| Adduct | | A-2 | A-5 | A-2 | A-5 | A-1 | A-1 | A-1 | A-1 |
|  | | 59.6 | 59.6 | 59.6 | 59.6 | 65.5 | 65.5 | 43.6 | 54.6 |
| Gaskamine ® 240 | | 36.1 | 36.1 | — | — | 36.1 | — | 20.6 | — |
| benzylated MXDA | | — | — | 40.4 | 40.4 | — | 40.4 | — | — |
| ethylhexylated MXDA | | — | — | — | — | — | — | — | 21.6 |
| Jeffamine ® D-230 | | — | — | — | — | — | — | 24.0 | — |
| Jeffamine ® RFD-270 | | — | — | — | — | — | — | — | 25.5 |
| Ancamine ® K 54 | | 5.9 | 5.9 | 6.0 | 6.0 | 6.1 | 6.2 | 5.7 | 6.0 |
| Viscosity (10') [Pa · s] | | 1.4 | 1.6 | 1.0 | 1.3 | 1.7 | 1.3 | 0.97 | 0.87 |
| König | (2 d SC) | 141 | 132 | 171 | 140 | 151 | 162 | 136 | 126 |
| hardness | (4 d SC) | 165 | 176 | 192 | 164 | 176 | 183 | 180 | 157 |
| [s] | (7 d SC) | 189 | 196 | 204 | 193 | 195 | 195 | 203 | 176 |
|  | (4 w SC) | 211 | 207 | 214 | 210 | 203 | 209 | 215 | 193 |
| Appearance (SC) | | good, high gloss | sl. cloudy, little gloss | good, high gloss | good, high gloss | good, high gloss | good, high gloss | good, high gloss | good, high gloss |
| König | (7 d 8°/80%) | 56 | 66 | 64 | 69 | 59 | 62 | 47 | 51 |
| h. | (+2 d SC) | 146 | 162 | 162 | 169 | 153 | 158 | 152 | 130 |
| [s] | (+7 d SC) | 190 | 189 | 197 | 195 | 187 | 192 | 193 | 168 |
|  | (+3 w SC) | 203 | 201 | 207 | 205 | 204 | 204 | 202 | 182 |
| Appearance (8°/80%) No. of markings | | good, high gloss; none | sl. cloudy, little gloss; none | good, high gloss; none | sl. cloudy, little gloss; none | good, high gloss; none | good, high gloss; none | good, high gloss; none | good, high gloss; none |

"sl." stands for "slight(ly)"; "ethylhexylated" stands for "ethyl-hexylated"

TABLE 4

Composition and properties of EZ-13 and Ref-9 to Ref-11.

| Example | | EZ-13 | Ref-9 | Ref-10 | Ref-11 |
|---|---|---|---|---|---|
| Resin comp.: | | | | | |
| Araldite ® GY-250 | | 167.2 | 167.2 | 167.2 | 167.2 |
| Araldite ® DY-E | | 31.8 | 31.8 | 31.8 | 31.8 |
| Curing agent-comp. | | | | | |
| Adduct | | A-3 | A-6 | A-7 | A-8 |
|  | | 62.5 | 54.7 | 65.2 | 59.7 |
| Jeffamine ® D-230 | | 24.0 | 24.0 | 24.0 | 24.0 |
| Ancamine ® K 54 | | 5.7 | 5.6 | 5.8 | 5.7 |
| Viscosity (10') [Pa · s] | | 1.2 | 1.0 | 2.7 | 1.8 |
| König | (2 d SC) | 148 | 130 | 174 | 181 |
| hardness | (4 d SC) | 189 | 171 | 214 | 192 |
| [s] | (7 d SC) | 195 | 192 | 225 | 219 |
|  | (14 d SC) | 209 | 197 | 227 | 220 |
| Appearance (SC) | | good, high gloss | dull, fine bubbles | good, high gloss | slight structure, dull |
| König | (7 d 8°/80%) | 42 | 32 | 62 | 76 |
| hardness | (+2 d SC) | 157 | 106 | 197 | 155 |

TABLE 4-continued

Composition and properties of EZ-13 and Ref-9 to Ref-11.

| Example | EZ-13 | Ref-9 | Ref-10 | Ref-11 |
|---|---|---|---|---|
| [s] (+7 d SC) | 189 | 157 | 220 | 193 |
| Appearance (8°/80%) | good, high gloss; 1 | dull/ cloudy; 2 | good, high gloss; 1 | dull; 1 |
| No. of markings | | | | |

The invention claimed is:

1. A curing agent, suitable for curing epoxy resins, comprising:
at least one adduct of trimethylhexamethylenediamine and cresyl glycidyl ether,
wherein the adduct is a reaction product of trimethylhexamethylenediamine and cresyl glycidyl ether in a trimethylhexamethylenediamine molecules/cresyl glycidyl ether molecules ratio in a range of 0.9 to 2.0.

2. The curing agent according to claim 1, wherein the trimethylhexamethylenediamine is 2,2,4-trimethyl-1,6-hexanediamine or 2,4,4-trimethyl-1,6-hexanediamine or a mixture of these isomers.

3. The curing agent according to claim 2, wherein the cresyl glycidyl ether is ortho-cresyl glycidyl ether.

4. The curing agent of claim 3, wherein the adduct is a reaction product of trimethylhexamethylenediamine and cresyl glycidyl ether in a trimethylhexamethylenediamine molecules/cresyl glycidyl ether molecules ratio in the range of 0.9 to 2.0.

5. The curing agent according to claim 4, wherein in addition to the adduct, additionally at least one further polyamine with at least two amine hydrogens reactive toward epoxide groups is present.

6. The curing agent according to claim 1, wherein the cresyl glycidyl ether is ortho-cresyl glycidyl ether.

7. The curing agent according to claim 1, wherein in addition to the adduct, additionally at least one further polyamine with at least two amine hydrogens reactive toward epoxide groups is present.

8. The curing agent according to claim 7, wherein the additional polyamine is a polyamine with at least two primary aliphatic amine groups.

9. The curing agent according to claim 8, wherein the polyamine with at least two primary aliphatic amine groups is selected from the group consisting of: isophorone diamine, 1,3-bis(aminomethyl)cyclohexane, 1,4-bis(aminomethyl)cyclohexane, bis(4-aminocyclohexyl)methane, bis (4-amino-3-methylcyclohexyl)methane, 2,5(2,6)-bis(aminomethyl)bicyclo[2.2.1]heptane, 3(4),8(9)-bis(aminomethyl) tricyclo[5.2.1.0$^{2,6}$]decane, 1,3-bis(aminomethyl)benzene and ether group-containing polyamines with an average molecular weight of up to 500 g/mol.

10. The curing agent according to claim 7, wherein the additional polyamine is a polyamine with at least one secondary amino group.

11. The curing agent according to claim 10, wherein the polyamine with at least one secondary amino group is selected from the group consisting of N-monoalkylated and N,N'-dialkylated 1,6-hexanediamine, 1,5-diamino-2-methylpentane, 1,3-bis(aminomethyl)cyclohexane, 1,4-bis(aminomethyl)cyclohexane, 1,3-bis(aminomethyl)benzene, bis (hexamethylene)triamine, diethylenetriamine, triethylenetetramine, tetraethylenepentamine, dipropylenetriamine, N-(2-aminoethyl)-1,3-propanediamine and N,N'-bis(3-aminopropyl)ethylenediamine, with the alkyl groups benzyl, 2-phenyl ethyl, isobutyl, hexyl or 2-ethylhexyl.

12. The curing agent according to claim 11, wherein 5 to 90% of the amine hydrogens reactive toward epoxide groups in the curing agent originate from the adduct.

13. The curing agent according to claim 12, wherein a content of non-reactive diluents is less than 25 wt.-%.

14. The curing agent according to claim 7, wherein 5 to 90% of the amine hydrogens reactive toward epoxide groups in the curing agent originate from the adduct.

15. The curing agent according to claim 1, wherein a content of non-reactive diluents is less than 25 wt.-%.

16. An epoxy resin composition containing at least one epoxy resin and a curing agent according to claim 1.

17. The epoxy resin composition according to claim 16, wherein it is a two-component composition consisting of:
a resin component containing at least one epoxy resin; and
(ii) a curing agent component containing the curing agent.

18. A cured composition obtained from curing a composition according to claim 16.

19. An article containing a cured composition according to claim 18.

* * * * *